United States Patent [19]

Barlow et al.

[11] Patent Number: 5,404,535
[45] Date of Patent: Apr. 4, 1995

[54] APPARATUS AND METHOD FOR PROVIDING MORE EFFECTIVE REITERATIONS OF PROCESSING TASK REQUESTS IN A MULTIPROCESSOR SYSTEM

[75] Inventors: George J. Barlow, Tewksbury, Mass.; James W. Keeley, Nashua, N.H.

[73] Assignee: Bull HN Information Systems Inc., Billerica, Mass.

[21] Appl. No.: 781,524

[22] Filed: Oct. 22, 1991

[51] Int. Cl.$^6$ .................. G06F 13/24; G06F 13/26
[52] U.S. Cl. ................................ 395/725; 395/800; 364/230; 364/241.2; 364/242.2; 364/931.44; 364/941; 364/942.4
[58] Field of Search ............... 395/725, 800; 364/230, 364/241.2, 242.2, 931.44, 941, 942.4

[56] References Cited

U.S. PATENT DOCUMENTS

| 4,231,086 | 10/1980 | Tarbox et al. | 395/325 |
| 4,769,768 | 9/1988 | Bomba et al. | 395/725 |
| 4,831,518 | 5/1989 | Yu et al. | 395/650 |
| 5,027,271 | 6/1991 | Curley et al. | 395/725 |
| 5,125,096 | 6/1992 | Brantley, Jr. et al. | 395/800 |

Primary Examiner—Alyssa H. Bowler
Assistant Examiner—Denise Tran
Attorney, Agent, or Firm—Lewis P. Elbinger; John S. Solakian

[57] ABSTRACT

A multiprocessor computer system having a first processor having a first interrupt mechanism for generating interrupt requests, a second processor having a second interrupt mechanism, and a system bus for communicating interrupt requests from the first processor to the second processor. The second interrupt mechanism is responsive to an interrupt request by generating an acknowledge response on the system bus when the second processor accepts the interrupt request and generating a not acknowledge response on the system bus when the second processor contains a previous and pending interrupt request of higher level and refuses the interrupt request. The second interrupt mechanism is responsive to the completion of servicing of an interrupt request by the second processor by placing on the system bus an interrupt completed command, which includes an address identifying the second processor and a code indicating that the second processor has completing servicing an interrupt request. The first processor includes an interrupt retry means, which includes a refused interrupt register means responsive to a not acknowledge response from the second processor in response to an interrupt requested from the first processor for storing the channel number of the second processor, and level monitor logic connected from the system bus.

5 Claims, 3 Drawing Sheets

APPARATUS AND METHOD FOR PROVIDING MORE EFFECTIVE REITERATIONS OF PROCESSING TASK REQUESTS IN A MULTIPROCESSOR SYSTEM

CROSS REFERENCE TO RELATED APPLICATIONS

The present patent application is related to copending U.S. patents applications:

1. Method and Apparatus for Avoiding Processor Deadly Embrace in a Multiprocessor System, filed on Oct. 4, 1991, invented by Thomas F. Joyce and James W. Keeley, bearing Ser. No. 771,296, which is assigned to the same assignee as tis patent application.

2. Bus Interface State Machines, invented by James W. Keeley, filed on Oct. 4, 1991, bearing Ser. No. 771,712, which is assigned to the same assignee of this patent application.

3. Programmable Bus State Machine, invented by Thomas F. Joyce and James W. Keeley, filed on Oct. 4, 1991, bearing Ser. No. 771,297, which is assigned to the same assignee as this patent application.

4. Data Processing System Having a Bus Command Generated by One Subsystem on Behalf of Another Subsystem, invented by George J. Barlow, Arthur Peters, Richard C. Zelley, Elmer W. Carroll, Chester M. Nibby, Jr., and James W. Keeley, Ser. No. 944,052 filed Dec. 18, 1986 now abandoned.

5. Apparatus and Method of Loading A Control Store Memory of a Central Subsystem, invented by Richard C. Zelley, Mark J. Kenna, Jr., and Wallace A. Martland, Ser. No. 943,980, filed Dec. 18, 1986 and issued Apr. 3, 1990 as U.S. Pat. No. 4,914,576.

6. Apparatus and Method for Loading and Verifying A Control Store Memory of a Central Subsystem, invented by Chester M. Nibby, Jr., Richard C. Zelley, Kenneth E. Bruce George J. Barlow, and James W. Keeley, Ser. No. 943,984, filed Dec. 18, 1986 and issued Mar. 20, 1990 as U.S. Pat. No. 4,910,666.

7. Apparatus and Method of Loading Different Control Stores of a Multiprocessor to Provide a Multi-Personality System, Invented by Richard C. Zelley, Mark J. Kenna, Jr., and Wallace A. Martland, Ser. No. 943,985, filed Dec. 18, 1986.

8. Universal Peripheral Controller Self-Configuring Bootloadable Ramware, invented by John A. Klashka, Sidney L. Kaufman, Krzyaztof A. Kowal, Richard P. Lewis, Susan L. Raisbeck and John L. McNamara, Jr., Ser. No. 925,431, filed Oct. 31, 1986 and issued Feb. 7, 1989 as U.S. Pat. No. 4,803,623.

9. System Management Apparatus for a Microprocessor System, invented by George J. Barlow, Elmer W. Carroll, James W. Keeley, Wallace A. Martland, Victor M. Morganti, Arthur Peters and Richard C. Zelley, Ser. No. 869,164, filed May 30, 1986 and continued as Ser. No. 377,785, filed Jul. 6, 1989.

10. Memory System With Automatic Memory Reconfiguration, invented by Robert B. Johnson, Chester M. Nibby, Jr., and Edward R. Salas, Ser. No. 413,631, filed Sep. 3, 1982 and issued Mar. 26, 1985 as U.S. Pat. No. 4,507,730.

11. Memory Controllers With Burst Mode Capability, invented by Robert B. Johnson and Chester M. Nibby, Jr., Ser. No. 202,819, filed Oct. 31, 1980 and issued Dec. 28, 1982 as U.S. Pat. No. 4,366,539.

12. Resilient Bus System, invented by George J. Barlow and James W. Keeley, Ser. No. 717,201, filed Mar. 28, 1985 and issued Aug. 16, 1988 as U.S. Pat. No. 4,764,862.

13. Multiprocessor Shared Pipeline Cache Memory With Split Cycle and Concurrent Utilization, invented by James W. Keeley and Thomas F. Joyce, Ser. No. 655,473, filed Sep. 27, 1984 and issued Sep. 22, 1987 as U.S. Pat. No. 4,695,943.

14. Method and Apparatus for Resetting A Memory Upon Power Recovery, invented by Raymond Bowden III, Michelle A. Pence, George J. Barlow, Mark E. Sanfacon and Jeffery S. Somers, Ser. No. 593,917, filed Oct. 5, 1990.

15. Method and Apparatus for Performing Health Tests of Units of a Data Processing System, invented by George J. Barlow, Richard C. Zelley and James W. Keeley, Ser. No. 593,408, filed Oct. 5, 1990.

16. Method and Apparatus for Memory Retry, invented by George J. Barlow, Raymond Bowden III and Michelle A. Pence, Ser. No. 593,182, filed Oct. 5, 1990.

17. Method and Apparatus for Integrity Testing of Fault Monitoring Logic, invented by David Cushing, Edward Hutchins, Elmer W. Carroll and James Bertone, Ser. No. 593,179, filed Oct. 5, 1990.

18. Method and Apparatus for Adapting a Remote Communications Controller to a Variety of Types of Communications Modems, invented by R. C. Zelley, Ser. No. 629,745, filed Dec. 18, 1990.

BACKGROUND OF THE INVENTION

1. Field of Use

The present invention relates to the cooperative operation of multiple processors in a single system and, more particularly, to a means for reducing the number of interrupt retry attempts between processors of a system.

2. Prior Art

A recurring problem in present computer systems arises from the need to combine the various processors of a multiple processor system into a cooperative system, and in particular to the need to integrate communications between the processors of a system.

This problem frequently occurs in coordinating the operations of the interrupt mechanisms of the processors of the system. As is well known, "interrupts" are a primary means of communication between the elements of most computer systems, whereby one element of the system, such as a processor or peripheral device, hereinafter generally referred to as a "processor", may send a request, referred to as an "interrupt", to another element of the system, such as another processor or peripheral device, hereinafter also generally referred to as a "processor", requesting that the other element of the system perform some operation for the requesting element. Interrupts are commonly assigned priority levels and, if the processor receiving the interrupt is executing an operation or servicing an interrupt of lower priority level than the interrupt, the receiving processor will suspend, or interrupt, the current operation and perform the action requested by the interrupt. If, however, the receiving processor is servicing an interrupt of a high priority than the new request, the new request will be denied, commonly referred to as "not acknowledge", and the requesting processor must repeat the request for the interrupt at a later tie, and must generally continue to repeat the interrupt request until the request is accepted. The repetition of interrupt requests until accepted, however, can consume substantial amounts of processor and system bus resources that are urgently needed for actual operations.

This problem arises both in system using a single type of processor and, even more acutely, in systems using different types of processor units in a single system to allow the system of perform a wider range of operations than may be achieved through a system using a single type of processor or to increase the performance of the system by adding faster and more powerful processors or processors providing special capabilities.

The requirement for a multiple processor type system may arise, for example, from a requirement to provide a system which is capable of operating with both the application programs and user data files created for an installed, proprietary system and the new "industry standard", or "open system", operating systems and application programs. Such hybrid systems are becoming more common as the need increases in the computer industry to provide systems which allow a user which has a very large installed proprietary system base to "migrate" over time to the presently proposed "open systems" which use "industry standard" hardware and one of the "industry standard" operating systems. An example of such would be the combination of one of the present "industry standard" processor units, such as an Intel[1] 80486[2] microprocessor running the UNIX[3] operating system and compatible applications programs, into a system based upon a proprietary operating system and hardware, such as the DPS 6000[4] computer system available from Bull HN Information Systems Inc., which runs applications programs designed for the proprietary system. It is possible, in such a hybrid system, for one of the processor types to have some form of interrupt coordination communication among themselves, but for the other processor type to either have no form of interrupt coordination communication or to have a form of interrupt coordination communication which is not compatible with that of the first type of processors.

[1] Intel is a trademark of Intel Corporation.
[2] i486 is a trademark of Intel Corporation.
[3] Unix is a trademark of UNIX System Laboratories Inc.
[4] DPS and DPS6000 are trademarks of Bull NH Informations Systems Inc.

It is also well known, and a further problem in interrupt communication between processors, that different types of processors frequently recognize and use different types, numbers and levels of interrupts, so that communication between, for example, a peripheral device designed for a proprietary system such as a DPS 6000 and a processor such as the Intel 80486, are very difficult.

It is therefore an object of the present invention to provide a solution to this and other related problems in marrying, or interfacing, the interrupt mechanisms of different types of processors into a single, cooperative system.

SUMMARY OF THE INVENTION

The present invention describes a multiprocessor computer system having a first processor having a first interrupt mechanism for operating interrupt requests, a second processor having a second interrupt mechanism, and a system bus for communicating interrupt requests from the first processor to the second processor. Each interrupt request includes a first channel number identifying the first processor as the source of the request, a second channel number identifying the second processor as the destination of the request, and a code identifying the level of the interrupt request.

The second interrupt mechanism is responsive to an interrupt request by generating an acknowledge response on the system bus when the second processor accepts the interrupt request and generating a not acknowledge response on the system bus when the second processor contains a previous and pending interrupt request of higher level and reduces the interrupt request. The second interrupt mechanism is responsive to the completion of servicing of an interrupt request by the second processor by placing on the system bus an interrupt completed command, which includes an address identifying the second processor and a code indicating that the second processor has completing servicing an interrupt request.

The first processor includes an interrupt retry means, which includes a refused interrupt register means responsive to a not acknowledge response from the second processor in response to an interrupt requested from the first processor for storing the channel number of the second processor, and level monitor logic connected from the system bus. The level monitor logic detects the occurrence of an interrupt completed command on the system bus, compares the address in the interrupt completed command to a second processor identification stored in the refused interrupt register means, and generates a retry interrupt output to the first processor when the address in the interrupt completed command corresponds to a second processor identification stored in the refused interrupt register means. The first processor is responsive to an interrupt retry output from the level monitor means by retrying the corresponding previously refused interrupt request.

The foregoing and other objects, features and advantages of the present invention will be apparent from the following description of the invention and embodiments thereof, as illustrated in the accompanying figures, wherein:

DESCRIPTION OF PREFERRED EMBODIMENTS

The following will first describe a means for interfacing the interrupt mechanism of one type of processor to that of another type of processor when the interrupt mechanisms of the two types of processors which recognize and use different types, numbers and levels of interrupts. It will be recognized by those of ordinary skill in the art that such interrupt interfacing may be added to any or all of the processors in a multi-type processor system.

The following will then describe the apparatus of the present invention for reducing the reiteration of interrupt requests from one processor to another processor when an initial interrupt request by the requesting processor has been refused by the recipient processor.

Figure 1:
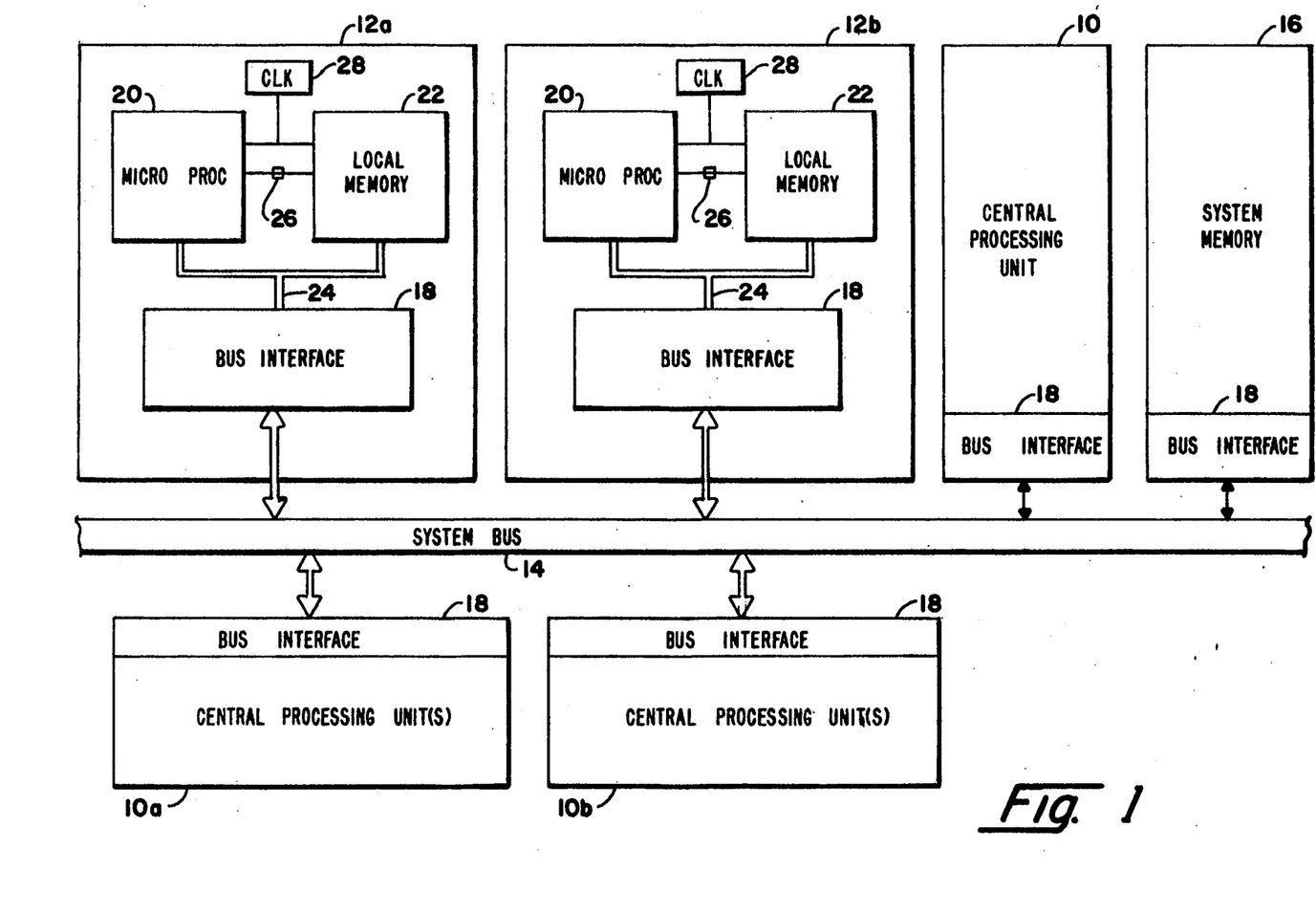
FIG. 1 is a block diagram of a computer system incorporating the present invention; and, FIG. 2 is a block diagram of processor with logic for interfacing the interrupt mechanisms of the various processors of the system of FIG. 1; and, FIG. 3 is a block diagram of a processor with logic for coordinating interrupt operations between processors and, in particular, for determining when a processor may retry a denied interrupt request.

Referring to FIG. 1, therein is shown a multiprocessor computer system which includes a plurality of Central Processing Units 10, 10a and 10b and peer Processors 12a and 12b which tightly couple in common to a System Bus 14 and to a Main, or System, Memory 16. Each Processor 10 and 12, as shown, includes a Bus Interface 18 which enables the unit to transmit or receive requests in the form of comments, interrupts, data or responses/status to another unit on System Bus 14. In the preferred embodiment, System Bus 14 operates asynchronously and uses a split bus cycle protocol which provides higher performance by granting other units bus cycles during the period of time a unit is waiting for main memory to furnish data in response to an earlier request made by that unit. In the present implementation, System Bus 14 is, for example, a MEGABUS[5] asynchronous system bus and, for further information regarding this type of bus interface and operation, reference may be made to U.S. Pat. No. 3,997,896.

[5] MEGABUS is a trademark of Bull NH Information Systems Inc.

Referring to FIG. 1, it is seen that each peer Processor 12 includes a Microprocessor 20, a Local Memory 22 and Interface Buses 24 which couple to Bus Interface circuits 18, as shown. Microprocessor 20 and Local Memory 22 are tightly coupled through a Local Processor Bus 26 and operate under control of clock inputs provided by a Clock Circuit (CLK) 28. Microprocessor 20 is a high performance 32-bit processor which operates at clock speeds of up to 33 MHz and in the preferred embodiment corresponds to an Intel 80486 chip.

The Intel 80486 chip includes a microprocessor, a floating-point math coprocessor, a memory cache controller and a 8K RAM cache unit. The principal processing function is performed by the microprocessor while complex processing functions, such as floating operations, are performed by the math coprocessor. The internal cache unit provides fast access to the data required for processing. In the preferred embodiment, peer processors 12 operate under the control of a UNIX operating system.

In the system of FIG. 1, Central Processing Units 10 function as host processors. In the preferred embodiment, each processor takes the form of a Bull DPS6000 system which operates under the control of the Bull HVS proprietary operating system. Each of the processors are organized to operate in an independent manner and have access to the full complement of system resources, such as input/output units, main memory and the like.

Figure 2:
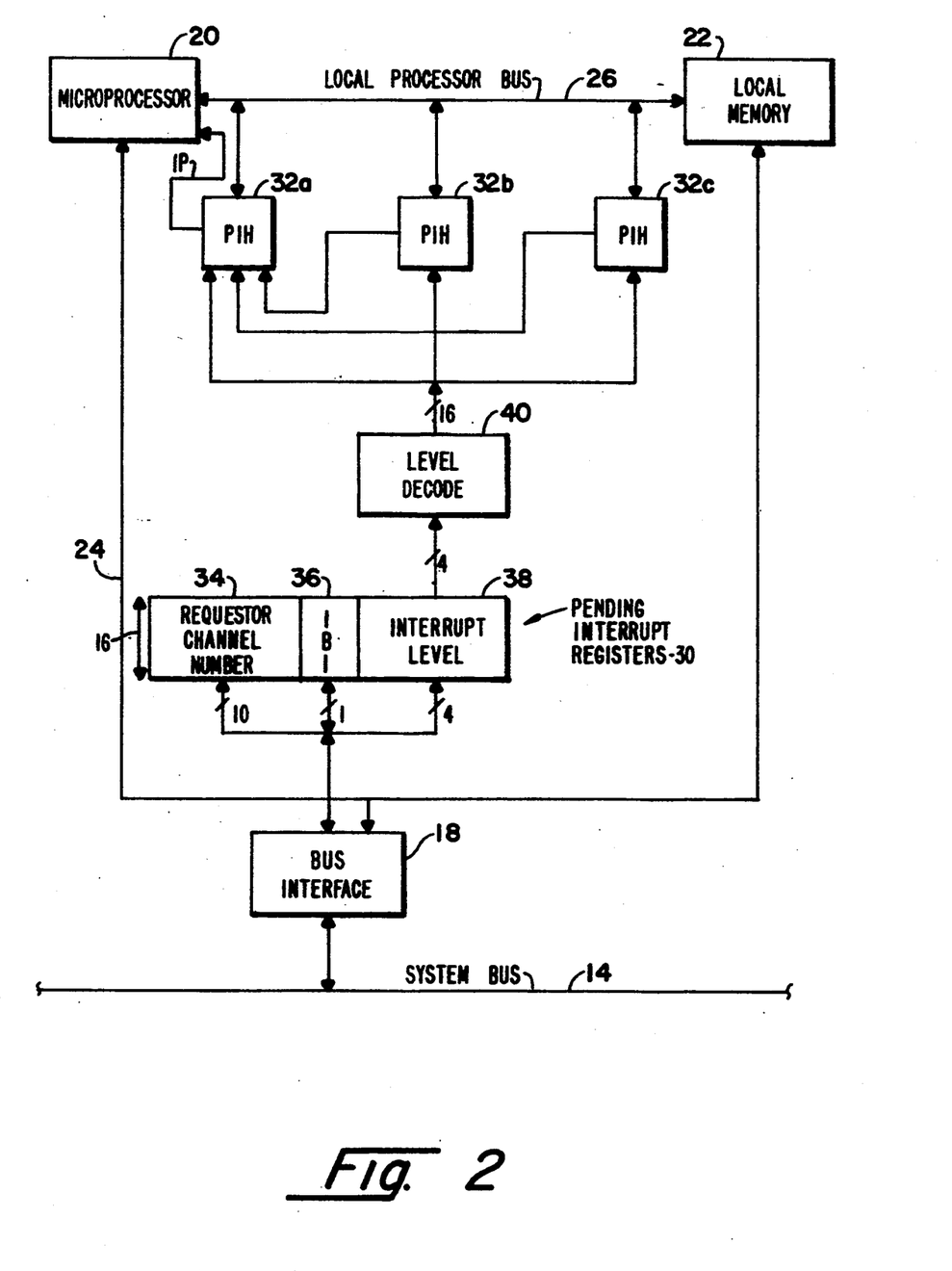

Shown in FIG. 2 is a block diagram of a Processor 12 with the logic of the present invention for interfacing the interrupt mechanisms of Processors 12 with the interrupt mechanisms of Central Processing Units 10, System Bus 14 and the other devices and elements of System 10 to form a single, cooperative system. It will be understood in the discussions herein that the term "processor" refers to any Processor 10 or 12 or other device connected from and having access to System Bus 14 and that the interrupt interface mechanism operations and apparatus described herein may be used and operate between any two or more "processors" in the system, or even for interrupts of a "processor" by itself, so that any processors of the system may be the "first" and "second" processors described herein.

As shown, the interrupt interfacing logic includes Pending Interrupt Registers 30, which are bidirectionally connected from the Processor 12's Bus Interface 18 and a set of Priority Interrupt Handlers (PIH) 32a through 32c, which are connected from outputs of Pending Interrupt Registers 30 and which are chained together with a final Interrupt Output (INT) to Microprocessor 20. PIHs 32 are also bidirectionally connected to Local Processor Bus 26. In the present implementation, which as described below handles 16 levels of interrupts, PIHs 32 are comprised of Intel 8259 Priority Interrupt Handlers, which are described in the Intel Microsystem Components Handbook, Microprocessors, volume 1, ISBN 1-555-12-001-6.

Referring first to Pending Interrupt Registers 30, Pending Interrupt Registers 30 is provided to receive and store interrupt requests received by a Processor 12 from another device or element of the system through System Bus 14 and the Processor 12's Bus Interface 18. Pending Interrupt Registers 30 are essentially comprised of a bank of registers, the bank containing one register for each level of interrupt to be recognized and serviced by the Processor 12's Microprocessor 20. Each register of Pending Interrupt Registers 30 is assigned to a corresponding interrupt level and will be used to store any interrupt received of the corresponding level. In the present implementation, 16 of the possible interrupt levels used in the portion of the system comprised of Central Processing Units 10, System Memory 16, System Bus 14 and the devices and peripherals designed for use with System Bus 14 have been selected to be handled and serviced by the Processors 12, so that Pending Interrupt Registers 30 correspondingly contain 16 registers. In other systems of in other implementations of the exemplary system described herein, more or fewer than 16 levels of interrupt may be chosen for servicing the Processors 12, with corresponding changes, which will be obvious to those of ordinary skill in the art, in the number of registers in Pending Interrupt Registers 30 and, as discussed further below, the number of interrupt levels handled by PIHs 32.

As has been briefly described above and as is described in greater detail in the above referenced U.S. Pat. No. 3,997,896, which is incorporated herein by reference, any processor or device in the system which is designed for use with System Bus 14 may make an interrupt request of any other device or processor connected from System Bus 14 by placing an interrupt request on System 14. Each interrupt request is essentially comprised of a number or address, often referred to as a channel number, identifying the device or processor to receive the request, a number or address identifying the source of the request, and a code identifying the request as an interrupt request and the level of the interrupt.

The Bus Interface 18 of the intended recipient of the interrupt request will recognize the interrupt request and itself as the intended recipient and will read the request from System Bus 14. In the instance when the intended recipient is a Processor 12, the interrupt request will be written into Pending Interrupt Registers 30 as described next below.

As shown, Pending Interrupt Registers 30 is comprised of a bark of registers, with one register for each level of interrupt to be handled by Processors 12. Each register stores a Requestor Channel Number Field 34, for storing the channel number identifying the source of an interrupt request, an Interrupt Busy Indicator Field 36 for storing a bit indicating whether the particular register presently contains a previously received and pending interrupt request at the level assigned to the register which has not yet been handled, and an Interrupt Level Field 38 for storing a number representing the level of the corresponding interrupt. In the present implementation, Channel Number Field 34 is a ten bit field and thus may identify up to $2^{10}$ individual processors or devices in the system while Interrupt Level Field 38 is a four bit field and this able to identify up to 16 different interrupt levels.

Upon receiving an interrupt request, the Bus Interface 18 of a Processor 12 will first determine the level of the received interrupt to determine whether the level of the received interrupt corresponds to an interrupt level selected to be handled by the Processor 12. If the received interrupt request corresponds to one of the interrupt levels selected for handling by the Processor 12, the Bus Interface 18 will then if the interrupt level does not correspond to one of the selected interrupt levels, the Bus Interface 18 will respond to the interrupt request by returning a Not Acknowledge (NAK) response on System Bus 14 to the source of the request.

If the interrupt request corresponds to one of the selected interrupt levels, Bus Interface 18 will read the Interrupt Busy Indicator Field 36 of the register assigned to the level of the received interrupt. If the Interrupt Busy Indicator Field 36 bit indicates that there is no previously received pending interrupt at that level, the Bus Interface 18 will write the channel number of the interrupt requestor and the level number of the request into, respectively, the Channel Number Field 34 and the Interrupt Level Field 38 of the corresponding register of Pending Interrupt Registers 30, and will send an Acknowledge (ACK) response to the requestor that the interrupt request has been received and accepted.

If the Interrupt Busy Indicator Field 36 bit indicates that there is a previously received interrupt request at that level which is still pending, Bus Interface 18 and Pending Interrupt Registers 30 will not accept the new interrupt request at that level, and Bus interface 18 will send a Not Acknowledge (NAK) response to the requestor indicating that the interrupt is not accepted. The interrupt requestor may than re-submit the interrupt request at a later time.

Lastly, a Level Decode Logic 40 is connected from the four bit outputs of the Interrupt Level Fields 38 of Pending Interrupt Registers 30. Level Decode Logic 40 receives the four bit interrupt level codes from Pending Interrupt Registers 30 and decodes the interrupt level codes into a corresponding 16 single bit outputs which are provided to the inputs of PIHs 32. Each single bit output line of Level Decode Logic 40 corresponds to one of the assigned interrupt levels and an active level on any one or more of the output lines of Level Decode Logic 40 will indicate that Pending Interrupt Registers 30 presently contains a pending interrupt request at the corresponding interrupt level.

The outputs of Level Decode Logic 40 are connected to inputs of PIHs 32a through 32c according to the levels represented by the outputs of Level Decode Logic 40 and according to the rules described in Intel Microsystem Components Handbook, Microprocessors, volume 1, ISBN 1-555-12-001-6. As indicated, PIHs 32b and 32c are connected as slave units to PIH 32a, which serves as the master priority interrupt handler unit, and the interrupt signal output of PIH 32a (INT) is connected to the interrupt input of Microprocessor 20.

The presence of an interrupt request stored in any of Pending Interrupt Registers 30 will thereby result in an interrupt signal input into Microprocessor 20. Microprocessor 20 will respond to an interrupt signal input by interrogating PIHs 32 through Local Processor Bus 26 and the PIHs 32 will respond by providing Microprocessor 20 with an indication of the particular highest priority PIH 32 input line having an active input from Level Decode Logic 40. From that information, Microprocessor 20 may read from the corresponding register in Pending Interrupt Registers 30 the Requestor Channel Number Field 34 of the register corresponding to the highest priority level interrupt then stored in Pending Interrupt Registers 30 and thus obtain the identify of the source of that interrupt request, and service the interrupt request accordingly.

While Microprocessor 20 may, in some implementation of the system, read information directly from Pending Interrupt Registers 30, the present implementation of Pending Interrupt Registers 30 and Bus Interface 18 prefers to use an indirect access to Pending Interrupt Registers 30 in order to take advantage of the existing design of the Bus Interface 18 and to provide inherent serialization of operations, thereby avoiding possible race conditions. That is, Microprocessor 20, upon receiving an indication of a pending interrupt stored in Pending Interrupt Registers 30 and the identify of the register containing the highest level interrupt, will issue a read Pending Interrupt Register request to itself, that is, to the Microprocessor 20's Processor 12, through Bus Interface 18 and onto System Bus 14. The Bus Interface 18 of the Processor 12 will detect the read request issued to itself, and will respond by reading the requested contents of Pending Interrupt Registers 30 onto System Bus 14. The Bus Interface 18 will read the response place on System Bus 14 by itself and transfer the requested information from System Bus 14 to the Microprocessor 20.

Figure 3:
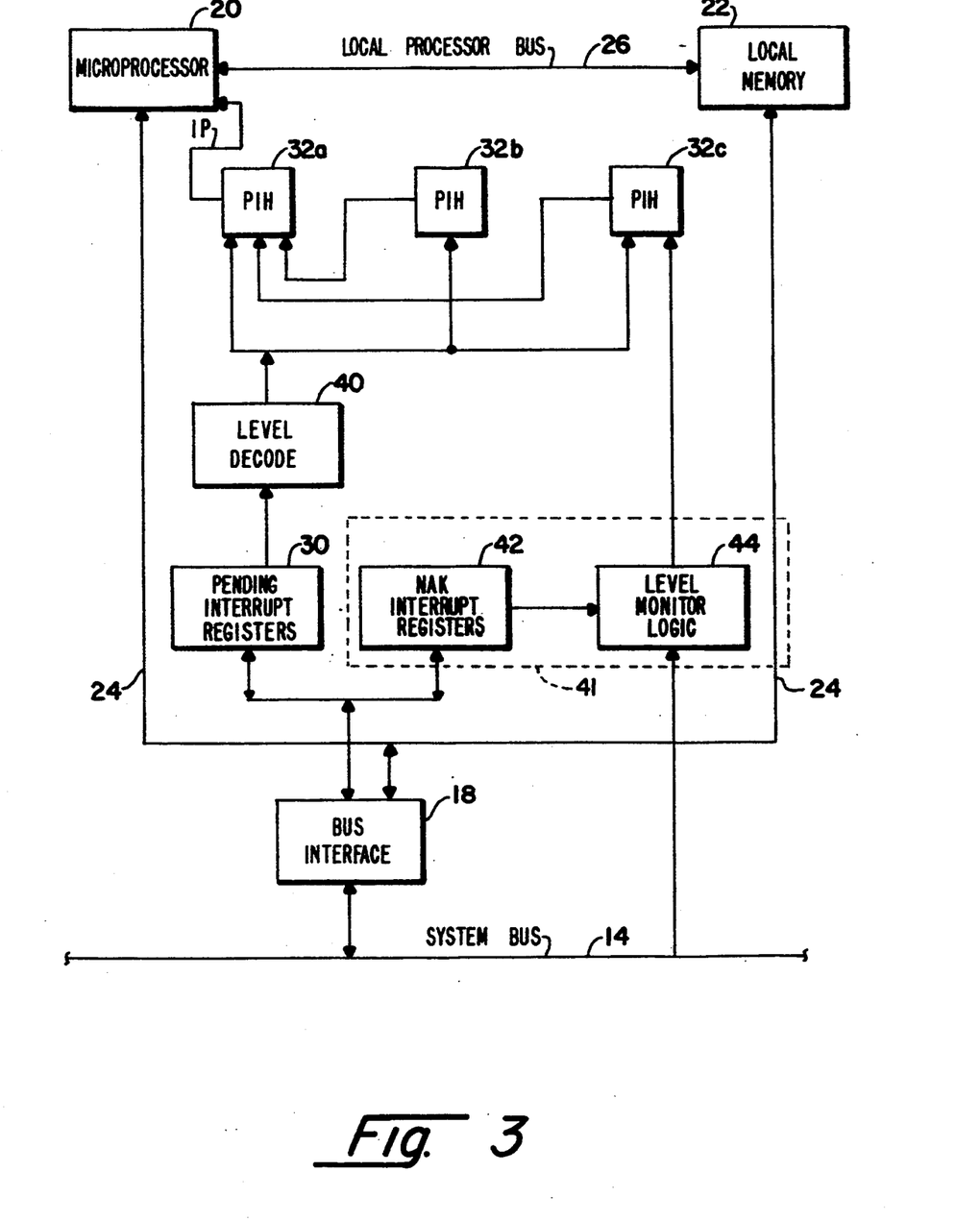

Referring now to FIG. 3, therein is shown a block diagram of a Processor 12 with the addition of the apparatus of the present invention for reducing the reiteration of interrupt requests from one processor to another processor when an initial interrupt request by the requesting processor has been refused by the recipient processor. Again, it will be recognized by those of ordinary skill in the art that the interrupt retry logic shown and described herein may be added to any processor or processors of the system and that again, any processors of the system may be the "first" and "second" processors described herein. In the following discussion, the term "first" processor is used to indicate a processor which is making an interrupt request to another processor of the system, which is referred to in the following discussion as the "second" processor.

As was previous described, a first processor of the system, such as a Processor 10 or 12 or a peripheral device, may make an interrupt request to a second processor of the system, such as a second Processor 10 or 12 or peripheral device, through System Bus 14. In the example shown herein, the Processor 12 may initiate the request for an interrupt and transmit this request to its associated Bus Interface 18, which will than generate and place on System Bus 14 the corresponding interrupt request. As has been described, each interrupt request is essentially comprised of a number or address, often referred to as a channel number, identifying the device or processor to receive the request, a number or address identifying the source of the request, and a code identifying the request as an interrupt request and the level of the interrupt.

The Bus Interface 18 of the second processor, which is identified in the request as the recipient of the interrupt request will detect and receive the interrupt request form System Bus 14. If the second processor accepts the interrupt request, the second processor will acknowledge acceptance of the request by placing an "acknowledge" (ACK) response on System Bus 14, and this response will be received from System Bus 14 by the first processor. If the second processor cannot accept the interrupt request, however, for example, when the second processor is servicing a previously received interrupt request of higher priority level, the second processor will refuse to accept the interrupt request and will indicate this refusal by placing a "not acknowledge" (NAK) response on System Bus 14. ACK and NAK responses are generally similar in format to an interrupt request, but contain ACK and NAK codes in place of the field in an interrupt request which identifies the request as an interrupt request and the level of the interrupt.

In the event of a NAK response to an interrupt request, the first processor will receive a NAK response from System 14 and will respond by storing an identification of the second processor in a field or register in NAK Interrupt Register 42, and will indicate to the second processor that the request has been refused at that time and must be resubmitted at a later time. In the present implementation, the identification or address of the second processor stored in NAK Interrupt Register 42 will be comprised of the channel number of the second processor or, as described further below, a portion of the channel number of the second processor.

Associated with NAK Interrupt Register 42 is Level Monitor Logic 44 which is connected from System Bus 14 and which monitors "level changes" of the processors connected from System Bus 14, that is, indications appearing on System Bus 14 that a given processor, such as the second processor which was the intended recipient of an interrupt request, has been changed its "level" with respect to servicing interrupts.

In this regard, it was described above that Microprocessor 20 and Bus Interface 18 use an indirect access to Pending Interrupt Registers 30 in order to take advantage of the existing design of the Bus Interface 18 and to provide inherent serialization of operations, thereby avoiding possible race conditions. That is, Microprocessor 20, upon receiving an indication of a pending interrupt stored in Pending Interrupt Registers 30 and the identity of the register containing the highest level interrupt, will issue a read Pending Interrupt Register request to itself, that is, to the Microprocessor 20's Processor 12, through Bus Interface 18 and onto System Bus 14. The Bus Interface 18 of the Processor 12 will detect the read request issued to itself, and will respond by reading the requested contents of Pending Interrupt Registers 30 onto System Bus 14. The Bus Interface 18 will read the responses place on System Bus 14 by itself and transfer the requested information from System Bus 14 to the Microprocessor 20.

Bus Interface 18 of all processors connected from System Bus 14 use a similar indirect access to the interrupt handling mechanisms of the processors for the same reasons and the result is that each processor, when completing the servicing of an interrupt, will execute a sequence of one or more commands or requests to itself pertaining to the completion of the servicing of the interrupt through its Bus Interface 18 and, accordingly, System Bus. Such commands and requests generally pertain, for example, to the clearing of certain interrupt registers.

As a result, however, the interrupt servicing operations of a given processor will result in one or more commands or requests appearing on System Bus 14 at the conclusion of the processor's servicing of any interrupt request that had been pending in that processor.

Level Monitor Logic 44 monitors the commands and addresses appearing on System Bus 14 for such interrupt related command and requests from a processor to itself and compares the addresses, that is, the channel numbers of such commands and requests to the channel numbers stored in its associated NAK Interrupt Registers 42. The appearance of an end of interrupt servicing completed related command or request on System Bus 14 by a processor to itself which contains a channel number corresponding to a channel number stored in NAK Interrupt Registers 42 of a second processor which has previously refused an interrupt request from its processor, that is, has previously responded with a NAK response, indicates to Level Monitor Logic 44 that the second processor may have completed servicing of the higher level interrupt which caused the NAK response and that the second processor may now be available to receive the previously submitted interrupt request from the first processor.

Level Monitor Logic 44 will indicate the occurrence of a interrupt servicing complete command on System Bus 14 from a second processor to itself which corresponds to a channel number stored in NAK Interrupt Registers 42 by generating a Repeat Interrupt (RINT) signal to the interrupt handling logic of its associated processor. This is represented in FIG. 3 by the output RINT from Level Monitor Logic 44 to the PIHs 32 of the Processor 12.

The processor will respond to the RINT input from Level Monitor Logic 44 by determining from NAK Interrupt Registers 42 the identity of the processor corresponding to the interrupt servicing complete command and again generating the corresponding previous interrupt request onto System Bus 14 through Bus Interface 18, and the previously described operations will be performed once again. That is, the second processor may accept and service the request, as indicated by the second processor placing an ACK response on System Bus 14, or the second processor may once again refuse to accept the request and will place a NAK response on System Bus 14. In this latter instance, the processor will once again store the channel number of the refused interrupt request in NAK Interrupt Registers 42 and Level Monitor Logic 44 will again monitor System Bus 14 for the occurrence of a interrupt servicing complete command on System Bus 14 from a second processor to itself which corresponds to a channel number stored in NAK Interrupt Registers 42.

The interrupt retry logic described above thereby reduces the number of interrupt retry attempts that a given processor need make when an interrupt request has been refused by initiating the retry of a previously refused interrupt request to those points in the operation of the destination processor when the destination processor is most probably capable of accepting an interrupt request, that is, to those points when the destination processor has completed servicing of an interrupt.

It should be noted that, in the present implementation, certain ranges of channel numbers are assigned to certain types of processors connected from System Bus 14, so that NAK Interrupt Registers 42 and Level Monitor Logic 44 need not store and monitor all bits of the channel numbers appearing on System Bus 14, but only certain of those bits, thereby reducing the number of bits stored in NAK Interrupt Registers 42 for each channel number and the number of address lines monitored by Level Monitor Logic 44.

While the invention has been particularly shown and described with reference to a preferred embodiment of the method and apparatus thereof, it will be understood by those of ordinary skill in the art that various changes in form, details and implementation may be made therein without departing from the spirit and scope of the invention as defined by the appended claims.

What is claimed is:

1. A multiprocessor computer system, comprising:
   a first processor having a first interrupt mechanism for generating interrupt requests,
   a second processor having a second interrupt mechanism, and
   a system bus for communicating interrupt requests from the first processor to the second processor, each interrupt request including
      a first channel number identifying the first processor as the source of the request,
      a second channel number identifying the second processor as the destination of the request, and
      a code identifying the level of the interrupt request,
   the second interrupt mechanism being responsive to an interrupt request for
      generating an acknowledge response on the system bus when the second processor accepts the interrupt request, and
      generating a not acknowledge response on the system bus when the second processor contains a previous and pending interrupt request of higher level and refuses the interrupt request, and
   generating an interrupt completed command on the system bus when the second processor completes the servicing of an interrupt request, said interrupt completed command, including
      a channel number identifying the second processor, and
      a code indicating that the second processor has completed servicing an interrupt request,
   the first processor comprising,
      interrupt retry means, including
         a refused interrupt register means, responsive to a not acknowledge response from the second processor in response to an interrupt requested from the first processor, for storing the channel number of the second processor,
         level monitor logic connected to the system bus and to said refused interrupt register means for
      detecting the occurrence of an interrupt completed command on the system bus,
      comparing the channel number in the interrupt completed command to a second processor channel number stored in the refused interrupt register means, and
      generating a retry interrupt output signal to said first interrupt mechanism when the channel number in the interrupt completed command corresponds to a second processor channel number stored in the refused register means,
   the first interrupt mechanism being responsive to an interrupt retry output signal from the level monitor means for retrying the corresponding previously refused interrupt request.

2. A data processing system for providing more effective reiterations of processing task requests made in said system, said system being of the type wherein a plurality of data processors are coupled to a system bus, said system bus providing a path for information communication between any two of said processors, a unique identifier being associated with each of said processors; comprising
   a first of said processor for performing processing tasks on behalf of itself and, upon request, for others of said processors;
   a second of said processors which requests said first processor to perform a processing task by applying to said bus a first-type communication comprising a representation of the kind of processing task required to be performed by said first processor and the identifier of said first processor;
   said first processor responding to said first-type communication and, in accordance with the current processing activity of said first processor,
   performing the processing task represented thereby when said first processor accepts the processing task represented by said first-type communication,
   applying to said bus a second-type communication comprising a representation of a rejection and the identifier of said first processor, when said first processor rejects the processing task represented by said first-type communication, and
   applying to said bus a third-type communication comprising a representation of a processing task completion and the identifier of said first processor upon completion of each processing task initiated in response to a first-type communication;
   a storage member responsive to the presence of said second-type communication on said bus for storing the identifier of the processor generating said second-type communication;
   a monitor member coupled to said storage member and to said base and responsive to a third-type communication on said bus when said third-type communication comprises an identifier corresponding to an identifier held in said storage member for generating a notification signal; and
   a control circuit coupled to said monitor member and said second processor and responsive to the occurrence of said notification signal for controlling said second processor for again applying to said bus a first-type communication comprising the identifier which caused the generation of said notification signal by said monitor member.

3. The system of claim 2, wherein:
   said first-type communication further comprises the identifier of said second processor; and said second-type communication further comprises the identifier of said second processor.

4. The system of claim 2, wherein:
   said first-type communication further comprises a processing level representing the urgency for processing for the kind of processing task represented therein; and
   said first processor responds to said first-type communication in accordance with the relationship said processing level bears to processing levels of processing tasks which are currently acceptable to said first processor.

5. A method for providing more effective reiterations of processing task requests in a system of the type wherein said system comprises a plurality of data processors coupled to a system bus, wherein said system bus provides a path for information communication between any two of said processors, wherein a unique identifier is associated with each of said processors, and wherein a first of said processors performs processing tasks on behalf or itself and, upon request, for others of said processors; said method comprising the steps of:

a second of said processors applying to said bus a first-type communication comprising a representation of a particular kind of processing task required to be performed by said first processor and the identifier of said first processor, said first-type communication representing a request by said second processor to have said processing task performed;

said first processor monitoring said bus and responding to said first-type communication for performing the particular processing task represented by said first type communication when said first processor accepts the processing task represented by said first-type communication, applying to said bus a second-type communication comprising a representation of a rejection and the identifier of said first processor, when said first processor rejects the processing task represented by said first-type communication, and applying to said bus a third-type communication comprising a representation of a processing task completion and the identifier of said first processor after the completion of the performing of each processing task initiated in response to a first-type communication;

a storage number responding to the presence of said second-type communication on said bus for storing the identifier of the processor generating said second-type communication;

a monitor member responding to a third-type communication on said bus when said third-type communication comprises an identifier corresponding to an identifier determined by said monitor member to be held in said storage number for generating a notification signal; and a control circuit coupled to said second processor for responding to the occurrence of said notification signal for causing said second processor to again apply to said bus a first-type communication comprising the identifier which caused the generation of said notification signal by said monitor member.

* * * * *